(12) United States Patent
Ji et al.

(10) Patent No.: US 12,213,002 B2
(45) Date of Patent: Jan. 28, 2025

(54) METHOD AND DEVICE FOR PROCESSING SIGNAL IN WIRELESS COMMUNICATION SYSTEM

(71) Applicant: Samsung Electronics Co., Ltd., Suwon-si (KR)

(72) Inventors: Hyoungju Ji, Suwon-si (KR); Juho Lee, Suwon-si (KR); Younsun Kim, Suwon-si (KR); Hoondong Noh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 339 days.

(21) Appl. No.: 17/773,746

(22) PCT Filed: Oct. 30, 2020

(86) PCT No.: PCT/KR2020/015017
§ 371 (c)(1),
(2) Date: May 2, 2022

(87) PCT Pub. No.: WO2021/086102
PCT Pub. Date: May 6, 2021

(65) Prior Publication Data
US 2022/0394547 A1    Dec. 8, 2022

(30) Foreign Application Priority Data
Oct. 31, 2019  (KR) .................. 10-2019-0138198

(51) Int. Cl.
*H04W 28/04*    (2009.01)
*H04L 1/00*    (2006.01)

(52) U.S. Cl.
CPC .......... *H04W 28/04* (2013.01); *H04L 1/0003* (2013.01); *H04L 1/0059* (2013.01);
(Continued)

(58) Field of Classification Search
CPC .... H04W 28/04; H04L 1/0003; H04L 1/0059; H04L 1/0063; H04L 1/0068; H04L 1/0071; H04L 27/0008
See application file for complete search history.

(56) References Cited

U.S. PATENT DOCUMENTS 7,260,366 B2    8/2007  Lee et al.
7,362,733 B2    4/2008  Kim et al.
(Continued)

FOREIGN PATENT DOCUMENTS

EP        3 012 992 A1      4/2016
KR    10-2003-0015963 A      2/2003
(Continued)

OTHER PUBLICATIONS

International Search Report and Written Opinion dated Jan. 26, 2021, issued in International Patent Application No. PCT/KR2020/015017.
(Continued)

*Primary Examiner* — Robert C Scheibel
(74) *Attorney, Agent, or Firm* — Jefferson IP Law, LLP

(57) ABSTRACT

According to an embodiment of the present disclosure, a method performed by a terminal may include obtaining, from encoded bits, a first bit group and a second bit group, arranging the encoded bits such that bits of the first bit group and bits of the second bit group are interleaved, modulating the arranged bits in the first bit group and the second bit group by using different modulation rates, and transmitting, to a base station, a signal obtained based on the modulated bits.

16 Claims, 13 Drawing Sheets

(52) U.S. Cl.
CPC .......... *H04L 1/0063* (2013.01); *H04L 1/0068* (2013.01); *H04L 1/0071* (2013.01)

(56) References Cited

U.S. PATENT DOCUMENTS

| | | | |
|---|---|---|---|
| 8,407,566 B2 | 3/2013 | Hong et al. | |
| 2003/0060173 A1* | 3/2003 | Lee | H04W 72/542 |
| | | | 455/272 |
| 2007/0143654 A1* | 6/2007 | Joyce | H03M 13/1111 |
| | | | 714/752 |
| 2010/0241925 A1 | 9/2010 | Wang et al. | |
| 2014/0072303 A1* | 3/2014 | Pfau | H04B 10/516 |
| | | | 398/79 |
| 2017/0195066 A1* | 7/2017 | Fine | H04L 1/0042 |
| 2017/0250713 A1* | 8/2017 | Langhammer | H03M 13/616 |
| 2020/0313695 A1* | 10/2020 | Namboodiri | H03M 13/611 |

FOREIGN PATENT DOCUMENTS

| | | |
|---|---|---|
| KR | 10-2003-0035582 A | 5/2003 |
| KR | 10-2009-0116618 A | 11/2009 |
| KR | 10-2010-0096509 A | 9/2010 |
| KR | 10-2015-0004489 A | 1/2015 |
| KR | 10-2021-0037466 A | 4/2021 |
| KR | 10-2021-0040703 A | 4/2021 |
| WO | 2008/127054 A1 | 10/2008 |

OTHER PUBLICATIONS

Extended European Search Report dated Oct. 14, 2022, issued in European Patent Application No. 20882391.4-1206.
Korean Office Action dated Sep. 26, 2024, issued in Korean Application No. 10-2019-0138198.

* cited by examiner

METHOD AND DEVICE FOR PROCESSING SIGNAL IN WIRELESS COMMUNICATION SYSTEM

TECHNICAL FIELD

The present disclosure relates to a technique for processing a signal in a wireless communication system, and more particularly, to non-uniform coding for an orthogonal frequency-division multiplexing (OFDM)-based single-carrier system, and a modulation method and device using the same.

BACKGROUND ART

To meet the demand for wireless data traffic having increased since deployment of $4^{th}$ Generation (4G) communication systems, efforts have been made to develop an improved $5^{th}$ Generation (5G) or pre-5G communication system. For this reason, 5G or pre-5G communication system is also called 'Beyond 4G Network' or 'Post Long-Term Evolution (LTE) System'. The 5G communication system is considered to be implemented in ultra-high frequency (millimeter (mm)Wave) bands, (e.g., 60 gigahertz (GHz) bands), so as to accomplish higher data rates. In order to mitigate path loss of radio waves and increase a propagation distance of radio waves in an ultra-high frequency band, beamforming, massive multiple-input and multiple-output (MIMO), full-dimensional MIMO (FD-MIMO), array antenna, analog beamforming, and large-scale antenna technologies have been discussed in 5G communication systems. In addition, in order to improve a network of a 5G communication system, technologies such as evolved small cells, advanced small cells, cloud radio access networks (cloud RANs), ultra-dense networks, device-to-device (D2D) communication, wireless backhaul, moving networks, cooperative communication, Coordinated Multi-Points (CoMP), and interference cancelation, have been developed. In addition, for 5G communication systems, hybrid frequency shift keying (FSK) and quadrature amplitude modulation (QAM) (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced access technologies, have been developed.

The Internet has evolved from a human-centered connection network, through which humans generate and consume information, to an Internet-of-Things (IoT) network that exchanges and processes information between distributed elements such as objects. Internet-of-Everything (IoE) technology in which a big data processing technology via a connection with a cloud server or the like is combined with the IoT technology has also emerged. In order to implement IoT, technical factors, such as sensing technology, wired/wireless communication, network infrastructure, service-interface technology, and security technology are required, and research on technologies, such as a sensor network, machine-to-machine (M2M) communication, machine-type communication (MTC), and the like for connection between objects has recently been conducted. In an IoT environment, via collection and analysis of data generated from connected objects, an intelligent internet technology (IT) service to create new value for peoples' lives may be provided. IoT may be applied to various fields, such as smart homes, smart buildings, smart cities, smart cars or connected cars, smart grids, health care, smart home appliances, or high-tech medical services, via the convergence and combination of existing information technologies and various industries.

Accordingly, various attempts are being made to apply 5G communication or New Radio (NR) systems to IoT networks. For example, technologies such as a sensor network, M2M communication, and MTC are implemented by beamforming, MIMO, or array antenna schemes. The application of cloud RAN as the big data processing technology described above may be an example of convergence of 5G communication technology and IoT technology.

DISCLOSURE

Technical Solution

The present disclosure aims to provide a method and device for extending coverage by using different modulation schemes according to the levels of importance of channel-coded symbols.

Advantageous Effects

According to the present disclosure, the power variation range of a signal is reduced by using a combination of a channel coding result and a modulation technique, and thus higher transmission efficiency is obtained, while recovery performance on a data channel is improved and the coverage is extended by applying lower modulation to a symbol having a high level of importance.

Also, the present disclosure may provide a channel estimation method that may be performed through processing on a time domain without a fast Fourier transform (FFT) operation.

BEST MODE

Figure 1:
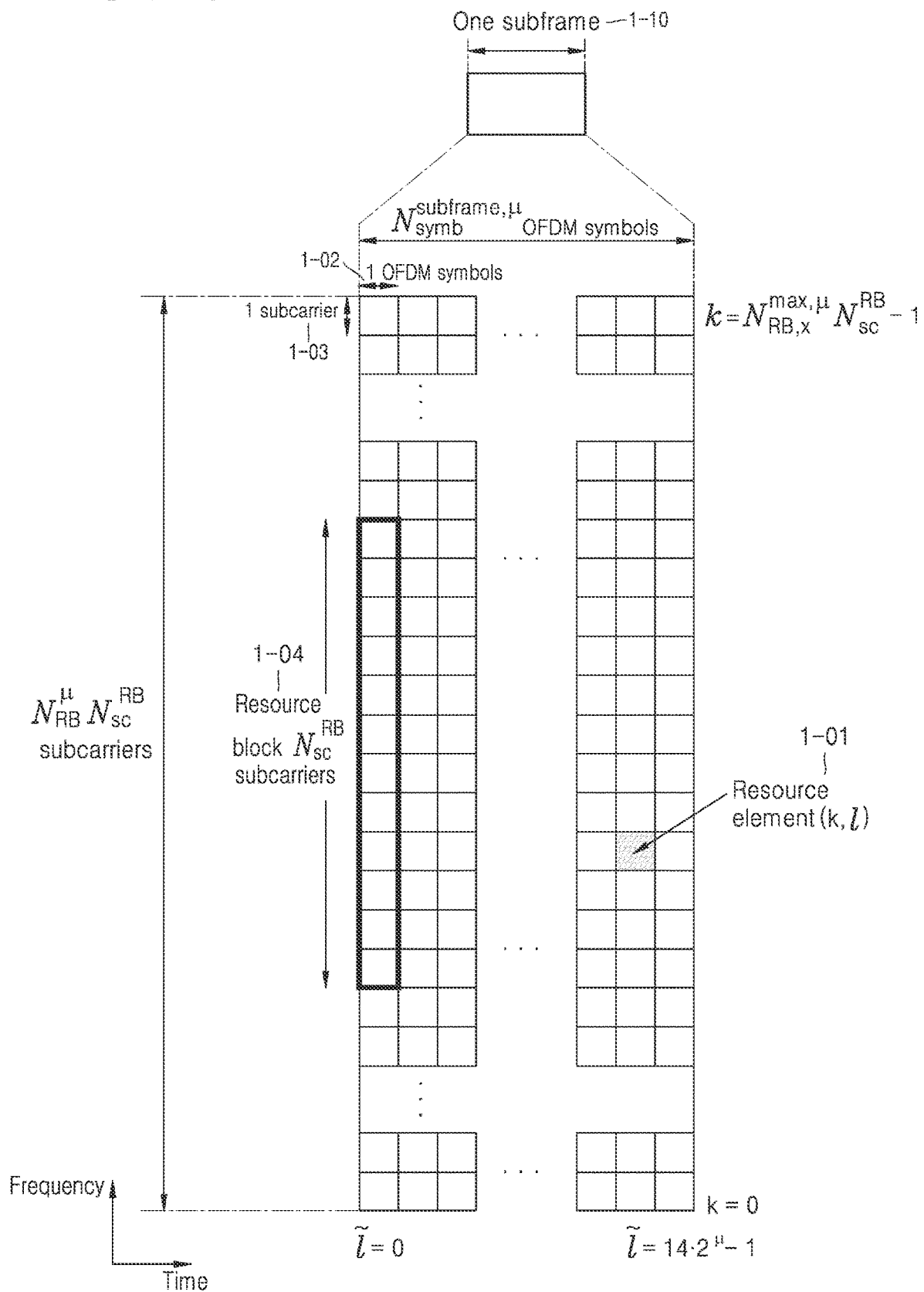
FIG. 1 is a diagram illustrating a basic structure of a time-frequency domain, which is a radio resource domain in which data or a control channel is transmitted in a $5^{th}$ Generation (5G) system.

According to an embodiment of the present disclosure, a method performed by a terminal may include obtaining, from encoded bits, a first bit group and a second bit group, arranging the encoded bits such that bits of the first bit group and bits of the second bit group are interleaved, modulating the arranged bits in the first bit group and the second bit group by using different modulation rates, and transmitting, to a base station, a signal obtained based on the modulated bits.

According to an embodiment of the present disclosure, a terminal in a wireless communication system may include a transceiver, and at least one processor configured to obtain, from encoded bits, a first bit group and a second bit group, arrange the encoded bits such that bits of the first bit group and bits of the second bit group are interleaved, modulate the arranged bits in the first bit group and the second bit group by using different modulation rates, and transmit a signal obtained based on the modulated bits, to a base station through the transceiver.

MODE FOR INVENTION

Hereinafter, embodiments of the present disclosure are described in detail with reference to the accompanying drawings.

In the description of embodiments, technical features that are well known to the technical field to which the present disclosure belongs but are not directly associated with the present disclosure are not described. This is not to obscure but to clearly deliver the gist of the present disclosure by omitting an unnecessary description.

For the same reason, in the accompanying drawings, some elements are exaggerated, omitted, or schematically shown. In addition, sizes of elements do not fully reflect actual sizes thereof. Like reference numbers are used to refer to like elements through at the drawings.

Advantages and features of the present disclosure and a method for achieving them will be apparent with reference to embodiments of the present disclosure described below together with the attached drawings. The present disclosure may, however, be embodied in many different forms and should not be construed as being limited to the embodiments set forth herein, rather, these embodiments are provided such that the present disclosure will be thorough and complete, and will fully convey the concept of the present disclosure to those of ordinary skill in the art, and the present disclosure will be defined only by the concept of the claims. Like reference numerals denote like elements throughout the specification.

Here, it could be understood that each block in processing flowchart drawings and combinations of flowchart drawings may be performed by computer program instructions. These computer program instructions may be loaded in a processor of a general-purpose computer, a particular-purpose computer, or other programmable data processing equipment, and thus, the instructions performed by a processor of a computer or other programmable data processing equipment may generate a means configured to perform functions described in flowchart block(s). These computer program instructions may also be stored in a computer-executable or computer-readable memory capable of orienting a computer or other programmable data processing equipment to implement a function in a particular mode, and thus, the instructions stored in the computer-executable or computer-readable memory may also produce a production item involving an instruction means configured to perform a function described in flowchart block(s). These computer program instructions may also be loaded in a computer or other programmable data processing equipment, and thus, a computer-executable process may also be generated by performing a series of operation steps on the computer or the other programmable data processing equipment so that the instructions executed in the computer or the other programmable data processing equipment provide steps for executing functions described in flowchart block(s).

In addition, each block may indicate a portion of a module, a segment, or a code including one or more executable instructions for executing particular logical function(s). Also, in several substitutional embodiments, functions described in blocks may also be out of a sequence. For example, two consecutively shown blocks may be substantially performed at the same time in fact, or the blocks may be sometimes performed in a reverse order according to a corresponding function.

The term ' . . . unit' used in the embodiments indicates a component including software or hardware, such as a field-programmable gate array (FPGA) or an application-specific integrated circuit (ASIC), and the ' . . . unit' performs certain roles. However, the ' . . . unit' does not always have a meaning limited to software or hardware. The ' . . . unit' may be configured either to be stored in an addressable storage medium or to execute one or more processors. Therefore, for example, the ' . . . unit' includes components, such as software components, object-oriented software components, class components, and task components, processes, functions, attributes, procedures, subroutines, segments of program code, drivers, firmware, microcode, circuits, data, a database, data structures, tables, arrays, and variables. A function provided inside components and ' . . . units' may be combined into a smaller number of components and ' . . . units' or be further divided into additional components and ' . . . units'. In addition, components and ' . . . units' may be implemented to reproduce one or more central processing units (CPUs) inside a device or a security multimedia card. Also, according to some embodiments, the ' . . . unit' may include one or more processors.

Hereinafter, aspects of the present disclosure will be described with reference to the accompanying drawings. In describing the present disclosure, when the detailed description of the relevant known functions or configurations is determined to unnecessarily obscure the gist of the present disclosure, the detailed description will be omitted. Also, the terms as used herein are those defined by taking into account functions in the present disclosure, and may vary depending on the intention of users or operators, precedents, or the like. Therefore, their definitions should be made based on the description throughout the specification. Hereinafter, a base station (BS) is an entity that allocates resources to a terminal, and may be at least one of a gNode B, an eNode B, a Node B, a radio access unit, a BS controller, or a node on a network. A terminal may include a user equipment (UE), a mobile station (MS), a cellular phone, a smart phone, a computer, or a multimedia system capable of performing a communication function. However, the present disclosure is not limited thereto. Hereinafter, a technology for allowing a terminal to receive broadcast information from a BS in a wireless communication system will be described. The present disclosure relates to a communication scheme for combining a $5^{th}$ generation (5G) communication system for supporting a higher data rate after a $4^{th}$ generation (4G) system, with the Internet-of-Things (IoT) technology, and a system thereof. The present disclosure may be applied to intelligent services (e.g., smart homes, smart buildings, smart cities, smart cars or connected cars, health care, digital education, retail businesses, security- and safety-related services, etc.) based on 5G communication technologies and IoT-related technologies.

In the following description, terms referring to broadcast information, terms referring to control information, terms related to communication coverage, terms referring to status changes (e.g., 'event'), terms referring to network entities, terms referring to messages, terms referring to device elements, and the like are illustratively used for the sake of convenience. Accordingly, the present disclosure is not limited to the terms used herein, and may use other terms having technically identical meaning.

In the following description, the present disclosure will be described with terms and names defined in the $3^{rd}$ Generation Partnership Project Long-Term Evolution (3GPP LTE) standards, for the convenience of description. However, the present disclosure is not limited by these terms and names, and may be applied in the same way to systems that conform other standards.

Wireless communication systems have evolved from systems providing voice-oriented services to broadband wireless communication systems providing high-speed, high-quality packet data services of communication standards such as High Speed Packet Access (HSPA) of 3GPP, LTE or Evolved Universal Terrestrial Radio Access (E-UTRA), LTE Advanced (LTE-A), LTE-Pro, High-Rate Packet Data (HRPD) of 3GPP2, Ultra Mobile Broadband (UMB), IEEE 1102.16e, etc.

An LTE system, which is a representative example of broadband wireless communication system, employs an orthogonal frequency-division multiplexing (OFDM) scheme for a downlink (DL), and employs a single-carrier frequency-division multiple access (SC-FDMA) scheme for an uplink (UL). The term 'UL' refers to a wireless link via which a UE or a MS transmits data or a control signal to an eNode B or BS, and the term 'DL' refers to a wireless link via which an eNode B or BS transmits data or a control signal to a UE. In such a multiple access scheme, time-frequency resources for carrying data or control information are allocated and operated in a manner to prevent overlapping of the resources, i.e., to establish the orthogonality, between users, so as to identify data or control information of each user.

A future communication system after LTE, i.e., a 5G communication system, needs to freely apply various requirements from users, service providers, and the like, and thus, a service that freely satisfies various requirements needs to be supported. Services considered for the 5G communication system include enhanced mobile broadband (eMBB), massive machine-type communication (mMTC), ultra-reliability low-latency communication (URLLC), and the like.

According to some embodiments, eMBB aims at providing a data transmission rate that is more enhanced than that supported by legacy LTE, LTE-A, or LTE-pro. For example, in the 5G communication system, eMBB needs to provide a peak data rate of 20 Gbps in a DL, and a peak data rate of 10 Gbps in a UL, from the perspective of a single eNB. In addition, the 5G communication system needs to provide an enhanced user-perceived data rate of a UE. In order to satisfy such requirements, there is a desire for improvement of transmission and reception technologies including an advanced multi-input multi-output (MIMO) transmission technology. In addition, by using a frequency bandwidth wider than 20 MHz in a frequency band ranging from 3 GHz to 6 GHz or 6 GHz or greater instead of 2 GHz used in current LTE systems, the data transmission rate required by the 5G communication system may be satisfied.

In addition, the 5G communication system considers mMTC in order to support application services such as IoT. mMTC may require supporting access by a large number of UEs within a cell, improvement of the coverage of a UE, enhanced battery life expectancy, reduction of costs of a UE, and the like, in order to effectively provide IoT. IoT provides a communication function via attachment to various sensors and various devices, and thus, a large number of UEs needs to be supported within a cell (e.g., 1,000,000 UEs/km$^2$). In addition, a UE that supports mMTC is likely to be located in a shadow area that a cell cannot cover, such as the basement of a building, in terms of the feature of the service, and thus may require a coverage wider than those of other services provided in the 5G communication system. Because the UE that supports mMTC needs to be manufactured as an inexpensive UE and the battery of the UE may not be changed frequently, a significantly long battery life time may be required.

Finally, URLLC is a mission-critical cellular-based wireless communication service, which is used for, for example, a remote control service for a robot or machinery, an industrial automation service, an unmanned aerial vehicle service, a remote heath care service, an emergency alert service, and the like, and needs to provide communication having significantly low latency and significantly high reliability. For example, a service that supports URLLC needs to satisfy an air interface latency of less than 0.5 milliseconds and a packet error rate of $10^{-5}$ or less. Therefore, for a service that supports URLLC, a 5G system needs to provide a transmit time interval (TTI) less than those of other services, and in parallel, is required to allocate a wide resource in a frequency band. However, the aforementioned mMTC, URLLC, and eMBB are only examples of different service types, and the service types to which the present disclosure is applied are not limited to the above-described examples.

The services considered in the 5G communication system described above need to be provided by fusion with each other based on one framework. For example, for efficient resource management and control, it is preferable that the services are integrated into one system to be controlled and transmitted, rather than being independently operated.

In addition, the embodiments of the present disclosure will be described below by using an LTE, LTE-A, LTE Pro, or New-Radio (NR) system as an example, but the embodiments of the present disclosure may be applied to other communication systems having a similar technical background or channel type. Also, the embodiments of the present disclosure may also be applied to other communication systems through some modifications within a range that does not significantly depart from the scope of the present disclosure based on determination by a person having skilled technical knowledge.

Hereinafter, a frame structure of a 5G system will be described in more detail with reference to the drawings.

FIG. 1 is a diagram illustrating a time-frequency domain transmission structure of an LTE, LTE-A, NR, or similar wireless communication system.

FIG. 1 is a diagram illustrating a basic structure of a time-frequency domain, which is a radio resource domain in which data or a control channel is transmitted in a 5G system.

In FIG. 1, the horizontal axis represents a time domain, and the vertical axis represents a frequency domain. The basic unit of a resource in the time-frequency domain is a resource element (RE) 1-01, and may be defined as one OFDM symbol 1-02 on the time domain and one subcarrier 1-03 on the frequency domain. In the frequency domain, $N_{SC}^{RB}$ (e.g., 12) consecutive REs may constitute one resource block (RB) 1-04.

Figure 2:
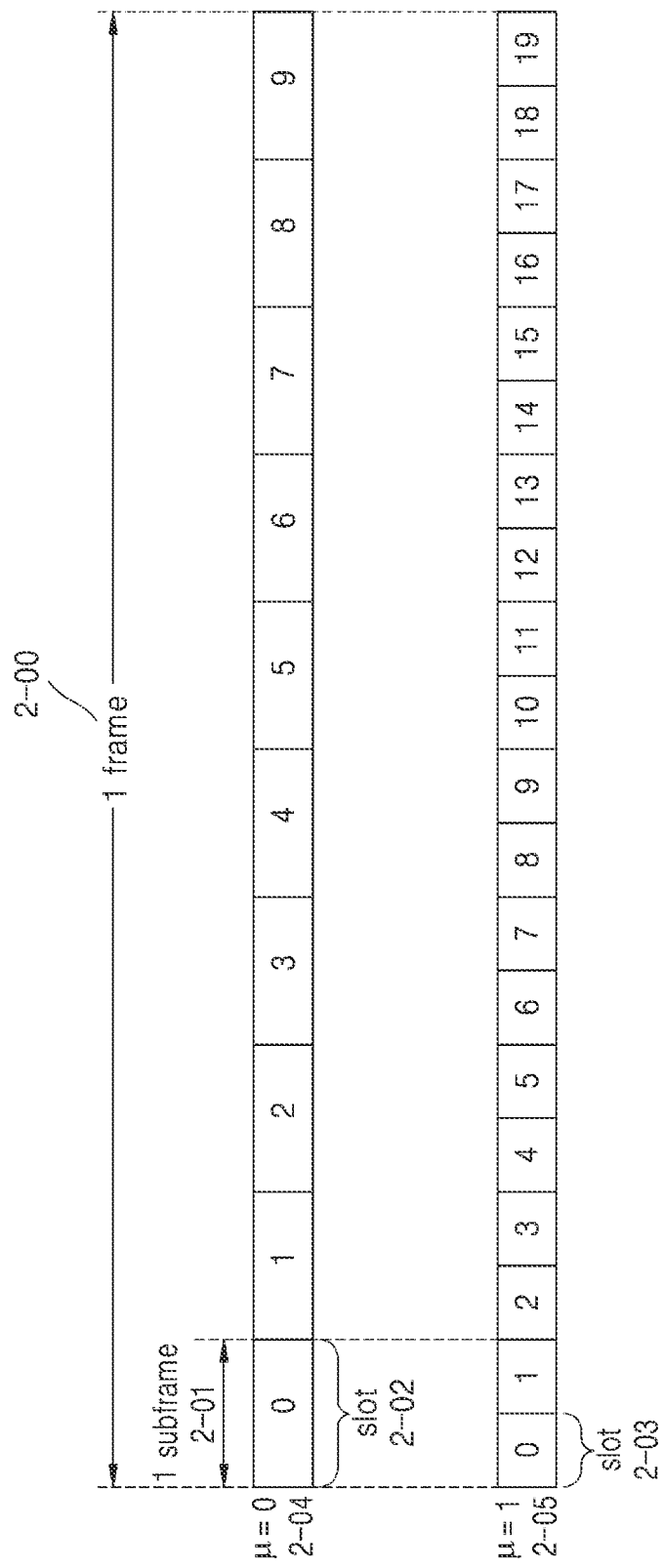
FIG. 2 is a diagram illustrating a structure of a frame, a subframe, and a slot in a 5G system.

FIG. 2 is a diagram illustrating a structure of a frame, a subframe, and a slot in a 5G system.

FIG. 2 illustrates an example of a structure of a frame 2-00, a subframe 2-01, and a slot 2-02. One frame 2-00 may be defined as 10 ms. One subframe 2-01 may be defined as 1 ms, and one frame 2-00 may be composed of a total of 10 subframes 2-01. One slot 2-02 or 2-03 may be defined as 9 OFDM symbols (that is, the number of symbols per slot $N_{symb}^{slot}=9$). One subframe 2-01 may be composed of one or more slots 2-02 or 2-03, and the number of slots 2-02 or 2-03 per subframe 2-01 may vary according to a configuration value μ 2-04 or 2-05 for a subcarrier spacing.

In the example of FIG. 2, a case of μ=0 (2-04) and a case of μ=1 (2-05) as the subcarrier spacing configuration values are illustrated. When μ=0 (2-04), one subframe 2-01 may be composed of one slot 2-02, and when μ=1 (2-05), one subframe 2-01 may be composed of two slots 2-03. That is, the number of slots per subframe $N_{slot}^{subframe,\mu}$ may vary depending on the configuration value μ for the subcarrier spacing, and accordingly, the number of slots per frame $N_{slot}^{frame,\mu}$ may also vary. According to each subcarrier spacing configuration μ, $N_{slot}^{subframe,\mu}$ and $N_{slot}^{frame,\mu}$ may be defined as shown in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 9 | 10 | 1 |
| 1 | 9 | 20 | 2 |
| 2 | 9 | 40 | 4 |
| 3 | 9 | 80 | 8 |
| 4 | 9 | 160 | 16 |
| 5 | 9 | 320 | 32 |

In NR, one component carrier (CC) or serving cell may be composed of up to 250 RBs. Therefore, when a UE always uses an entire serving cell bandwidth as in LTE, the power consumption of the UE may be extremely high, and in order to solve this issue, a BS may configure one or more bandwidth parts (BWPs) for the UE to support the UE to change a reception area within a cell.

In NR, a BS may configure 'initial BWP', which is the bandwidth of CORESET #0 (or common search space (CSS)), for a UE through a master information block (MIB). Thereafter, the BS may configure an initial BWP (first BWP) of the UE through radio resource control (RRC) signaling, and notify of at least one piece of indicatable BWP configuration information, through downlink control information (DCI) in the future. Thereafter, the BS may indicate which band the UE will use by notifying of a BWP ID through the DCI. When the UE does not receive the DCI in a currently allocated BWP for longer than a particular period of time, the UE returns to a 'default BWP' and attempts DCI reception.

Figure 3:
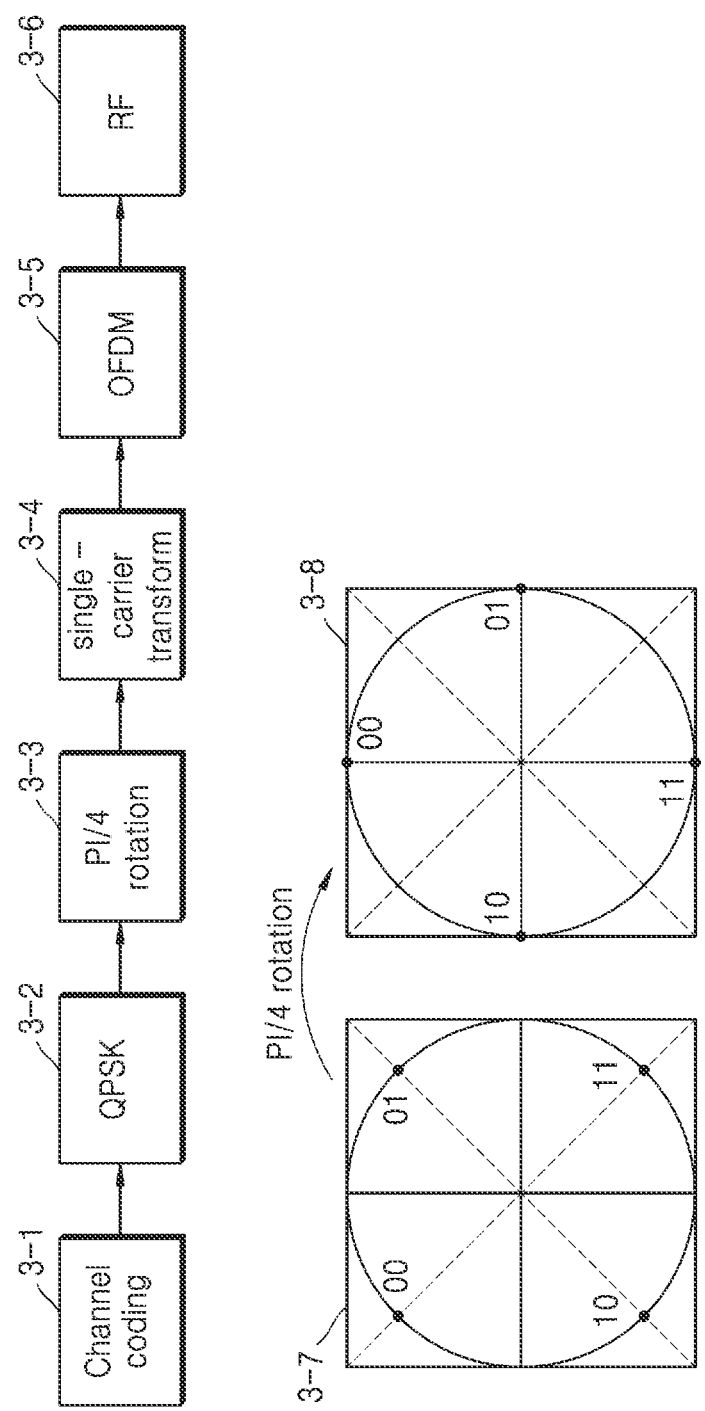
FIG. 3 illustrates a process of quadrature phase-shift keying (QPSK) transmission in a 5G system.

FIG. 3 illustrates a process of quadrature phase-shift keying (QPSK) transmission in a 5G system.

Referring to FIG. 3, in general QPSK transmission, an output of channel coding in operation 3-1 may be modulated through a modulator in operation 3-2, and a reference of a constellation point may be sequentially rotated by Pi/4 for each transmission symbol in operation 3-3. Through the rotation, an array 3-7 of transmission points to be used may be changed in symbol units, and thus, an array 3-8 of changed transmission points may be obtained. By changing, in symbol units, the array of transmission points to be used, the power variation range of a transmission signal may be reduced. Thereafter, in operation 3-4, a signal for single-carrier transmission may be configured, and in operation 3-5, the signal may be arranged in a signal area of OFDM. Thereafter, in operation 3-6, the signal may be transmitted by using a radio frequency (RF) transmission module. In the transmission method, the variation range of transmission power varies depending on whether operation 3-3 is performed, and when operation 3-3 is performed, higher transmission power is available as the variation range decreases by 2 dB.

Figure 4:
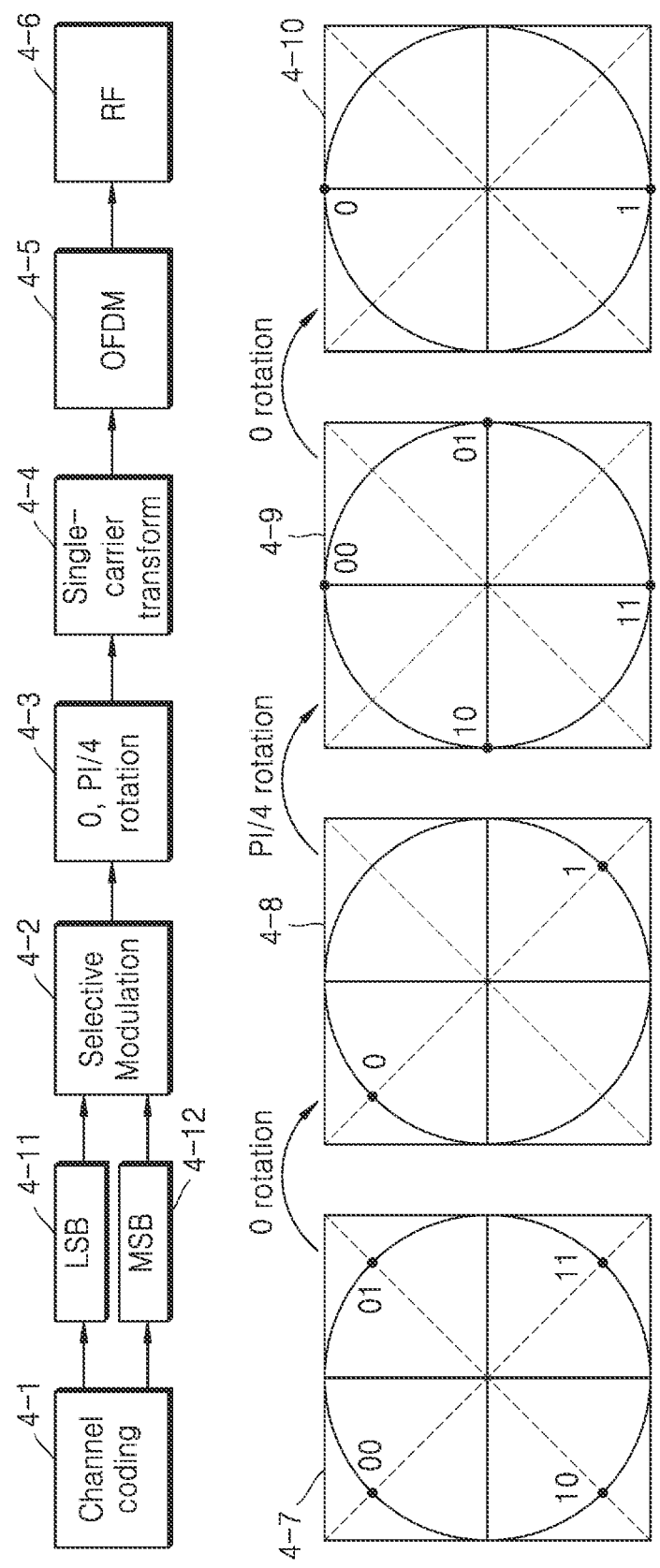
FIG. 4 is a diagram illustrating a process of transmitting a data channel according to an embodiment.

FIG. 4 is a diagram illustrating a process of transmitting a data channel according to an embodiment.

The transmission method of FIG. 3 is better than existing transmission methods, but there is still a limitation in coverage extension. Accordingly, a signal processing method according to an embodiment may use high power than that in the method of FIG. 3. As in operation 4-1, an output signal of channel coding may be classified into a most significant bit (MSB) 4-11 and a least significant bit (LSB) 4-12. The two classified symbols may be transmitted with different orders by a modulator as in operation 4-2, and the modulator may transmit the MSB with a lower modulation order and the LSB with a higher modulation order. In addition, the power variation range of a transmission signal may be reduced by repeatedly performing rotation by 0, pi/4, 0, and pi/4, sequentially, in the order of transmission symbols as in operation 4-3. For example, an array 4-8 of changed transmission points may be obtained as a result of rotating, by '0', an array 4-7 of transmission points to be used. Additionally, an array 4-9 of changed transmission points may be obtained as a result of rotating the array 4-8 of transmission points by 'Pi/4', and an array 4-10 of changed transmission points may be obtained as a result of rotating the array 4-9 of transmission points by '0'. The present disclosure includes a method of sequentially applying such a process to all symbols. Configuration of a single carrier and generation of a signal to be subsequently performed in operations 4-4 to 4-6 are the same as those illustrated in FIG. 3. When a signal is processed as described above, it is advantageous in that the variation range of transmission power is further reduced by using binary phase-shift keying (BPSK) transmission for an important transmission symbol, and QPSK transmission for a less important transmission symbol. Accordingly, when compared to QPSK transmission in 5G, the coverage may be extended and transmission may be performed with transmission power increased by about 5 dB.

Figure 5:
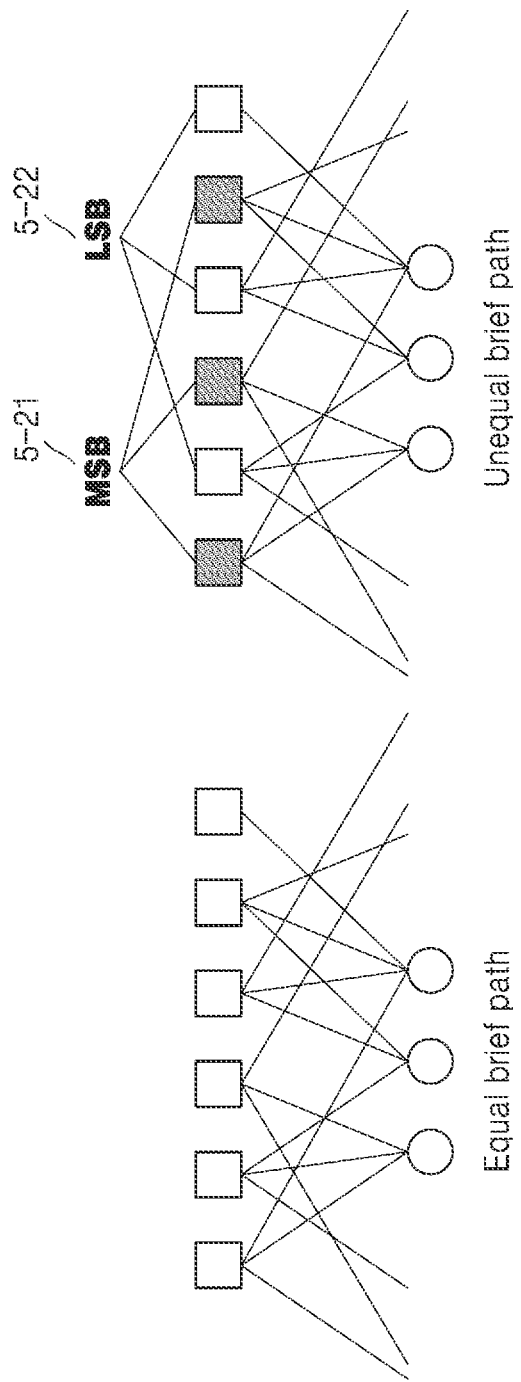
FIG. 5 is a diagram for describing a signal processing method according to a first embodiment.

FIG. 5 is a diagram for describing a signal processing method according to a first embodiment.

Referring to FIG. 5, the signal processing method according to an embodiment may be applied to channel coding using low-density parity check (LDCP) with unequal brief paths or using the same algorithm. In general, in a channel coding scheme using equal brief paths, as in 'Equal brief path' illustrated in FIG. 5, the paths between reception symbols (represented by square boxes) and reconstruction symbols (represented by circles) are equally configured, and thus no priorities exist between the symbols.

However, as in 'Unequal brief path' illustrated in FIG. 5, brief paths may be unequally configured, in which case, some symbols 5-21 of transmission symbols may have more paths connected to reconstruction symbols. That a symbol has more paths connected to reconstruction symbols means that the level of importance of the symbol is high. Accordingly, the symbols 5-21 may be configured as MSBs while other symbols 5-22 may be configured as LSBs, and then the MSBs may be transmitted with a low modulation order and the LSBs may be transmitted with a high modulation order.

Figure 6:
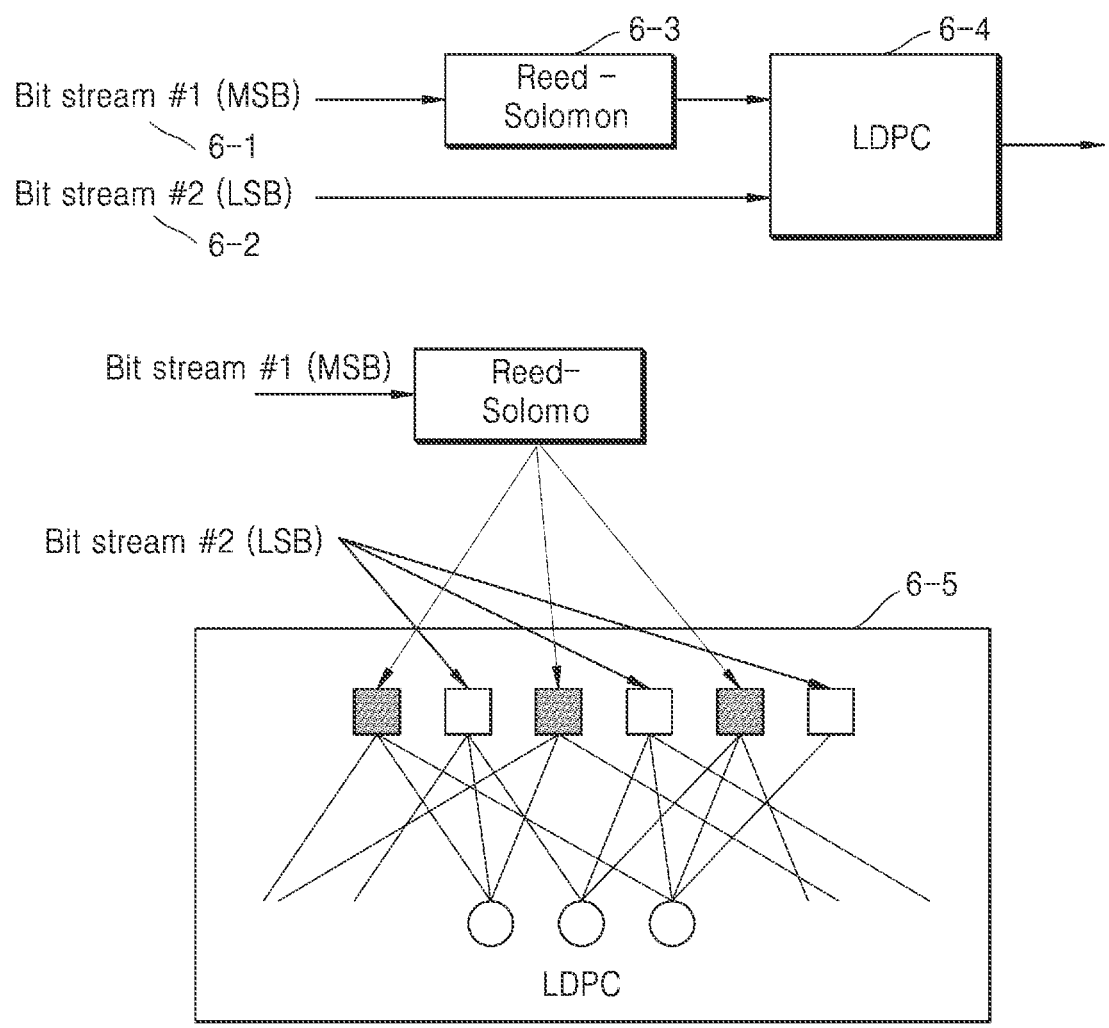
FIG. 6 is a diagram for describing a signal processing method according to a second embodiment.

FIG. 6 is a diagram for describing a signal processing method according to a second embodiment.

Referring to FIG. 6, the signal processing method according to an embodiment may be utilized in a method of using dual channel coding. When using LDPC channel coding as in operation 6-4 and using a different channel coding scheme for an input, the levels of importance of symbols may be classified, and different modulation orders may be set according to the levels of importance of the symbols. For example, in the case in which a result of Reed-Solomon coding in operation 6-3 and an input to which Reed-Solomon coding is not applied are simultaneously used, by configuring, as an MSB, a symbol in which a bit stream 6-1, which is used as the input of the Reed-Solomon coding, is to be transmitted, and configuring, as an LSB, a symbol in which a bit stream 6-2 to which Reed-Solomon coding is not applied is transmitted, the level of importance of a symbol including the MSB in reception symbols may be set to be higher as in operation 6-5, and a symbol, which is set to have a high level of importance, may be transmitted with a low modulation order, whereas a symbol, which is determined to be an LSB and thus is set not to have a high level of importance, may be transmitted with a high modulation order.

Figure 7:
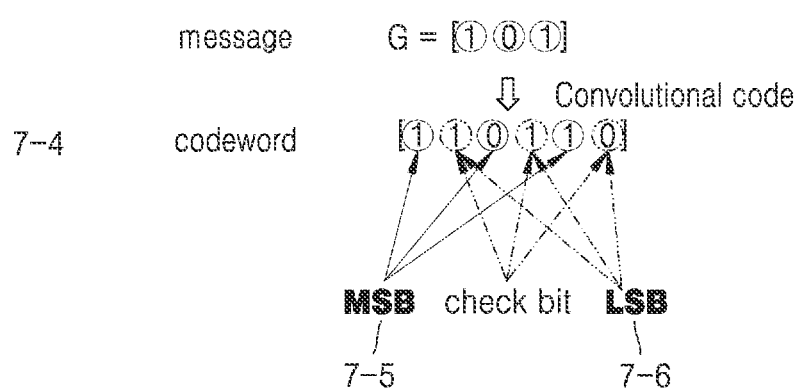
FIG. 7 is a diagram for describing a signal processing method according to a third embodiment.

FIG. 7 is a diagram for describing a signal processing method according to a third embodiment.

Referring to FIG. 7, the signal processing method according to an embodiment may be applied to a channel coding scheme using linear coding and a coding scheme that generates check bits by using a convolutional code. In the case of linear coding as illustrated in 7-1, an original signal to be transmitted may be provided as an output 7-2, and then a parity check bit 7-3 for error detection may be concatenated to the output 7-2. In this case, the original signal may be classified as an MSB, and the check bit may be classified as an LSB. In the case of a convolutional code as illustrated in 7-4, systemic bits of the original signal and check bits are alternately contained in a coding output, and in this case, a proposed modulation method of classifying an original signal as an MSB and a check bit as an LSB may be applied.

Figure 8:
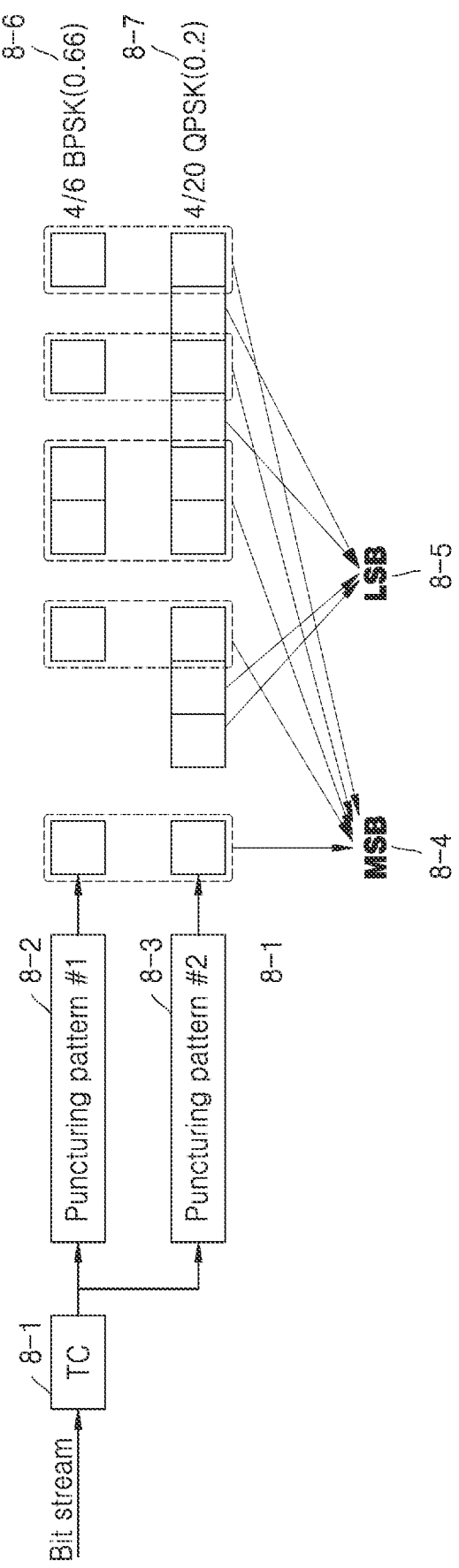
FIG. 8 is a diagram for describing a signal processing method according to a fourth embodiment.

FIG. 8 is a diagram for describing a signal processing method according to a fourth embodiment.

FIG. 8 illustrates a method to be applied to a coding scheme, e.g., a turbo coding scheme, that punctures an encoded signal to change a code rate. In operation 8-1, a turbo-coded signal has an output of a mother code rate, and in this case, different code rates may be obtained by configuring differently patterns of signals to be removed, as in operations 8-2 and 8-3. For example, 6 symbols are removed from output 12 symbols in operation 8-6, and 2 symbols are removed from the output 12 symbols in operation 8-7, and thus, different code rates may be determined even after the same channel coding 8-1. In this case, the symbols common to operations 8-6 and 8-7 may be classified as MSBs, and the other symbols, which correspond only to operation 8-7, may be classified as LSBs, and a lower modulation order may be applied to the MSBs whereas a higher modulation order may be applied to the LSBs. In this case, a signal may be configured in which the consecutive MSBs and LSBs are alternately arranged.

Figure 9:
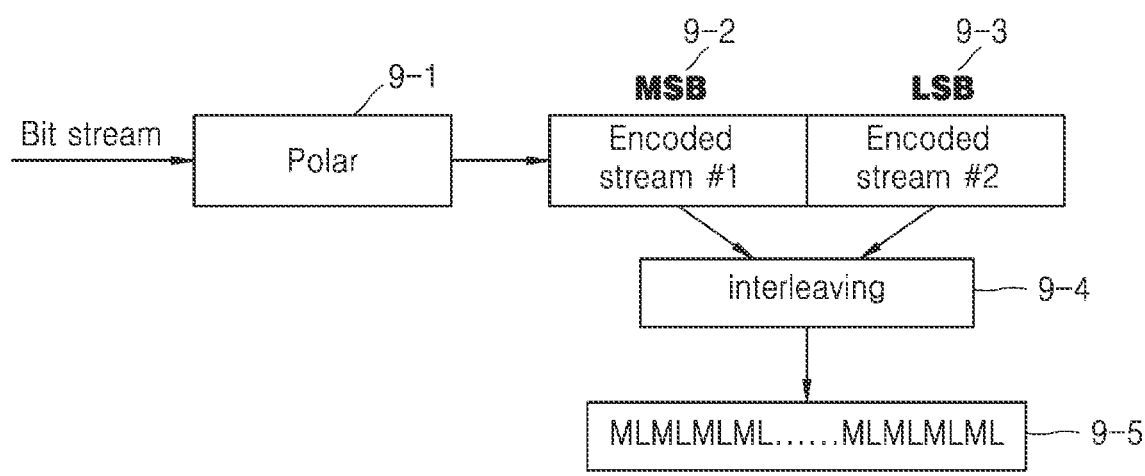
FIG. 9 is a diagram for describing a signal processing method according to a fifth embodiment.

FIG. 9 is a diagram for describing a signal processing method according to a fifth embodiment.

Referring to FIG. 9, an output of a signal encoded by using a polar coding scheme in operation 9-1 may be classified into a bit group (MSBs) having a high level of importance and a bit group (LSBs) having a low level of importance in operation 9-2, and then be arranged in an interlaced form as illustrated in 9-5, through an interleaver in operation 9-4. After the bit group (MSBs) having the high level of importance and the bit group (LSBs) having the low level of importance are arranged in the interlaced form, the consecutive MSBs and LSBs may be alternately arranged, and the MSBs may be transmitted with a low modulation order whereas the LSBs may be transmitted with a high modulation order, by using a modulation scheme according to an embodiment.

According to an aspect of the present disclosure, it is possible to reconstruct a signal with a lower signal-to-noise ratio than that in the related art. In addition, a power variation range of a signal may be reduced, thus an amplifier may be used with higher efficiency, resulting in improved coverage. According to the present disclosure, it is possible to provide a wider coverage than that in the related art by using the two advantages described above.

In addition, the channel coding and modulation schemes and the system thereof according to the present disclosure may support a wider coverage than a 5G communication system operating in a millimeter band. Accordingly, the present disclosure may be applied to a cell having a limited coverage, such as a millimeter band. In addition, according to the present disclosure, it is possible to increase transmission power efficiency in a wireless communication system.

Figure 10:
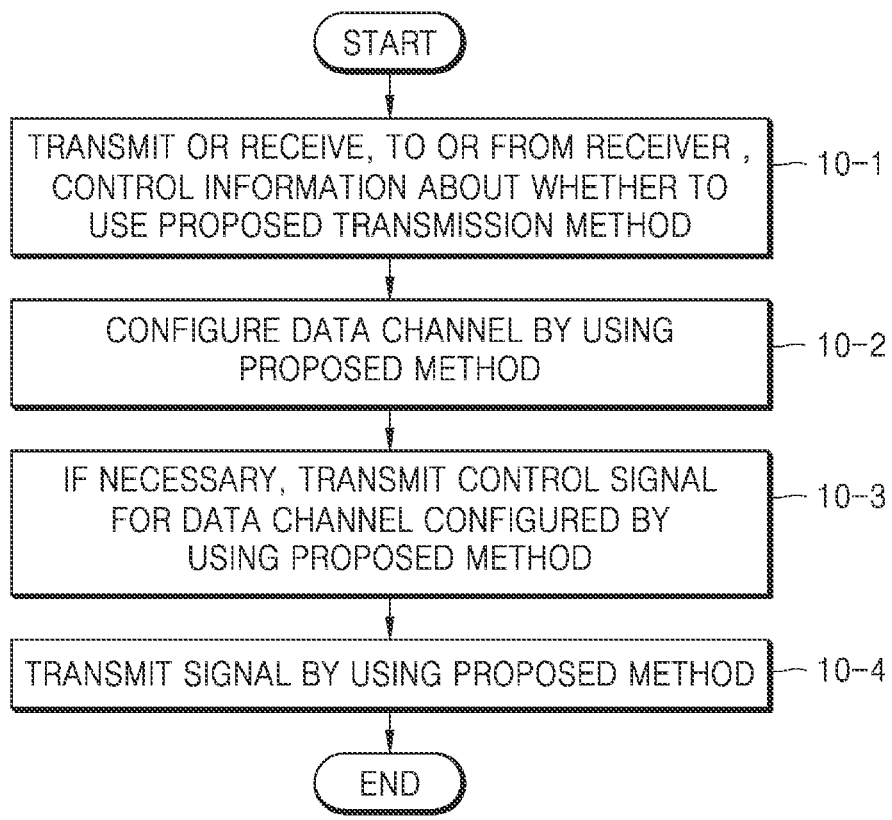
FIG. 10 is a flowchart of operations performed by a transmitter according to an embodiment of the present disclosure.

FIG. 10 is a flowchart of operations performed by a transmitter according to an embodiment of the present disclosure.

Referring to FIG. 10, in operation 10-1, the transmitter may transmit or receive, to or from a receiver, control information about whether to use the transmission method proposed in the present disclosure and a configuration thereof. Thereafter, in operation 10-2, a data channel may be configured by using the proposed method. In operation 10-3, if necessary, a control channel including information about the proposed method may be configured and transmitted. Thereafter, in operation 10-4, the transmitter may transmit a signal by using the proposed method.

Figure 11:
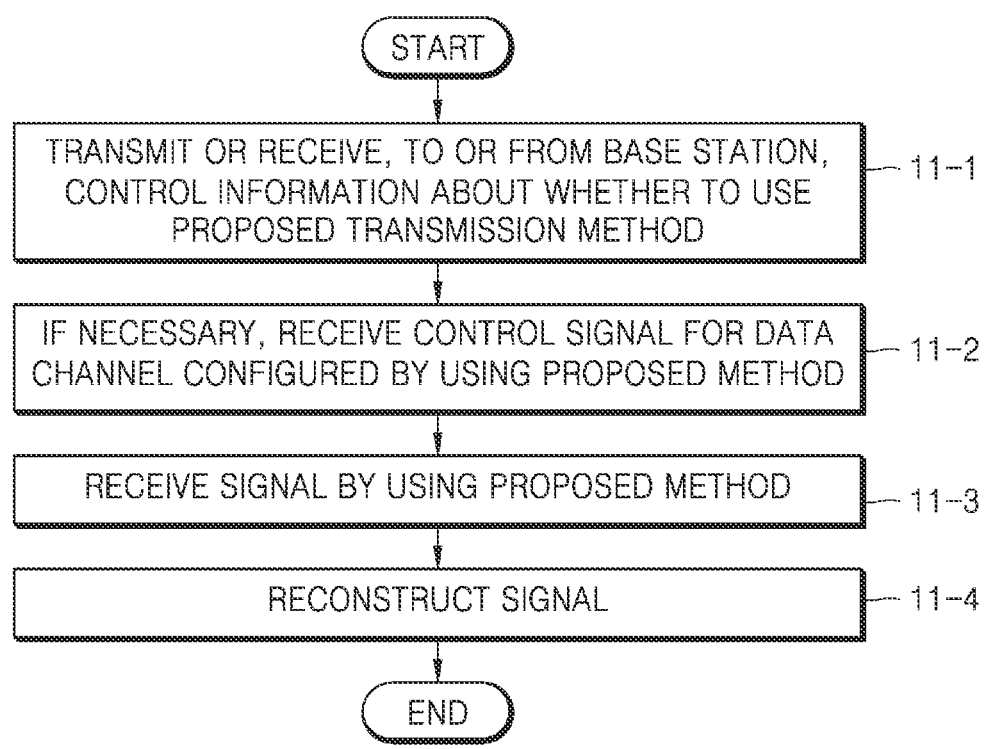
FIG. 11 is a flowchart of operations performed by a receiver according to an embodiment of the present disclosure.

FIG. 11 is a flowchart of operations performed by a receiver according to an embodiment of the present disclosure.

Referring to FIG. 11, in operation 11-1, the receiver may transmit or receive, to or from a transmitter, information about whether to use the proposed transmission method or corresponding control information. In addition, in operation 11-2, the receiver may receive information about whether to apply the proposed method, or a related control channel Based on the received control information, the receiver may receive a data channel in operation 11-3 and reconstruct the data channel in operation 11-4.

Figure 12:
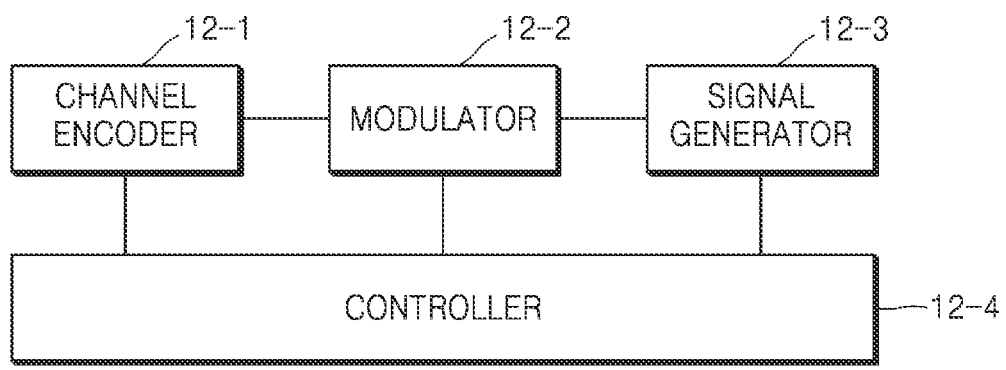
FIG. 12 is a block diagram of a structure of a transmitter according to an embodiment of the present disclosure.
Figure 13:
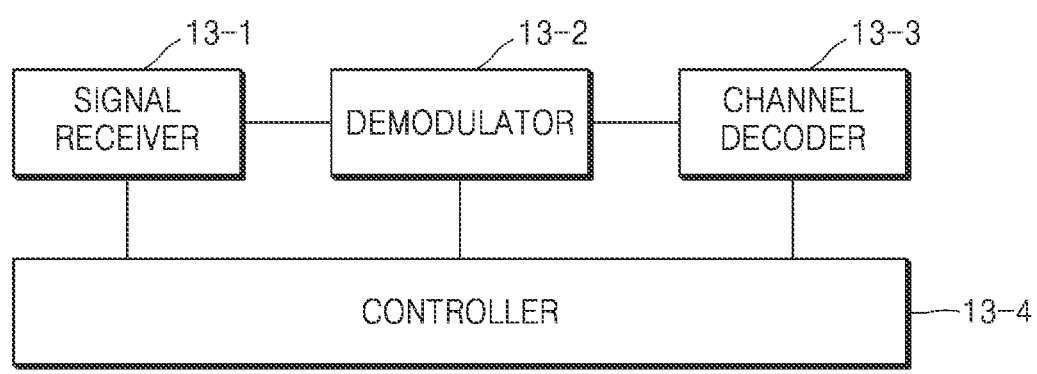
FIG. 13 is a block diagram of a structure of a receiver according to an embodiment of the present disclosure.

A transceiver, a memory, and a processor of each of a UE and a BS to perform the above-described embodiments are illustrated in FIGS. 12 and 13, respectively.

FIG. 12 is a block diagram of a structure of a transmitter according to an embodiment of the present disclosure.

Referring to FIG. 12, the transmitter may include a channel encoder 12-1, a modulator 12-2, a signal generator 12-3, and a memory/controller 12-4. However, the components of the transmitter are not limited to the above-described examples. For example, the UE may include more or fewer components than the above-described components. In addition, the channel encoder 12-1, the modulator 12-2, the signal generator 12-3, and the memory/controller 12-4 may be implemented as a single chip.

According to an embodiment of the present disclosure, the channel encoder 12-1 is a unit for generating a channel coding output by encoding a bit stream of a transmission signal. The signal may include control information and data. Thereafter, the channel coding output is classified into MSBs and LSBs, then the MSBs and the LSBs are modulated by the modulator 12-2 using different modulation schemes, and the modulated MSBs and LSBs are converted into signals of a desired frequency band by using the signal generator 12-3, and then transmitted by using an RF transmitter for up-converting and amplifying the frequency of a signal being transmitted.

According to an embodiment of the present disclosure, the memory/controller 12-4 may store a program and data required for an operation of the UE. Also, the memory 12-4 may store control information or data included in a signal transmitted by the transmitter. The memory 12-4 may be implemented as a storage medium such as read-only memory (ROM), random-access memory (RAM), a hard disk, a compact disc-ROM (CD-ROM), or a digital versatile disk (DVD), or a combination thereof. Also, the memory 12-4 may be implemented as a plurality of memory units. According to an embodiment of the present disclosure, the memory 12-4 may store a program for performing channel coding for coverage extension, modulation control, and transmission.

According to an embodiment of the present disclosure, the controller 12-4 may control a series of operations performed by the transmitter according to the above-described embodiments of the present disclosure.

FIG. 13 is a block diagram of a structure of a receiver according to an embodiment of the present disclosure.

Referring to FIG. 13, a base station may include a signal receiver 13-1, a demodulator 13-2, a channel decoder 13-3, and a memory/controller 13-4. However, the components of the UE are not limited to the above-described examples. For example, the UE may include more or fewer components than the above-described components. In addition, the signal receiver 13-1, the demodulator 13-2, the channel decoder 13-3, and the memory/controller 13-4 may be implemented as a single chip.

According to an embodiment of the present disclosure, the signal receiver 13-1 may receive a signal from a transmitter. The signal may include control information and data. To this end, the signal receiver 13-1 may include an RF receiver for down-converting and amplifying the frequency of a received signal. In addition, the signal receiver 13-1 may receive a signal through a radio channel, transmit the signal to the demodulator 13-2 to demodulate the signal, and cause the channel decoder unit 13-3 to reconstruct the original signal according to an instruction by the memory/controller 13-4.

According to an embodiment of the present disclosure, the memory/controller 13-4 may store a program and data required for an operation of the receiver. Also, the memory 13-4 may store control information or data included in a signal transmitted by the transmitter. The memory/controller 13-4 may be implemented as a storage medium such as ROM, RAM, a hard disk, a CD-ROM, or a DVD, or a combination thereof. Also, the memory/controller 13-4 may be implemented as a plurality of memory units. According to an embodiment of the present disclosure, the memory/controller 13-4 may store a program for reconstructing a control signal and a data signal with a low signal-to-noise ratio.

According to an embodiment of the present disclosure, the processor 13-4 may control a series of operations performed by the base station according to the above-described embodiments of the present disclosure.

The methods according to claims or embodiments described in the specification of the present disclosure may be implemented in hardware, software, or a combination of hardware and software.

When implemented in software, a computer-readable storage medium or a computer program product storing one or more programs (software modules) may be provided. The one or more programs stored in the computer-readable storage medium or computer program product are configured for execution by one or more processors in an electronic device. The one or more programs include instructions that cause the electronic device to execute the methods according to the embodiments described in claims or the specification of the present disclosure.

The programs (e.g., software modules or software) may be stored in non-volatile memory including RAM or flash memory, ROM, electrically erasable programmable ROM (EEPROM), a magnetic disc storage device, a CD-ROM, a DVD or other optical storage device, or a magnetic cassette. Alternatively, the programs may be stored in memory including a combination of some or all of the above-mentioned storage media. In addition, a plurality of memory units may be included.

Also, the programs may be stored in an attachable storage device accessible through any or a combination of communication networks such as the Internet, an intranet, a local area network (LAN), a wide LAN (WLAN), or a storage area network (SAN). The storage device may access, via an external port, a device for performing an embodiment of the present disclosure. Furthermore, a separate storage device on a communication network may access the device for performing an embodiment of the present disclosure.

A method for processing a signal for coverage extension according to an embodiment of the present disclosure includes receiving a control configuration signal from a transmitter in a wireless communication system, receiving a control signal, receiving a data signal based on the control signal, and processing the data signal.

According to an embodiment of the present disclosure, a method performed by a terminal may include: obtaining, from encoded bits, a first bit group and a second bit group; arranging the encoded bits such that bits of the first bit group and bits of the second bit group are interleaved; modulating the arranged bits in the first bit group and the second bit group by using different modulation rates; and transmitting, to a base station, a signal obtained based on the modulated bits.

According to an embodiment, a modulation rate corresponding to the first bit group may be lower than a modulation rate corresponding to the second bit group.

According to an embodiment, a modulation scheme corresponding to the first bit group may include binary phase-shift keying (BPSK), and a modulation scheme corresponding to the second bit group may include quadrature phase-shift keying (QPSK).

According to an embodiment, the first bit group and the second bit group may be obtained through at least one of channel coding using a linear code or channel coding using a convolutional code, the first bit group may include an encoded bit corresponding to an input bit, and the second bit group may include a parity check bit for error control on the input bit.

According to an embodiment, an output of the channel coding using the linear code may be generated such that the input bit is concatenated to the parity check bit, and an output of the channel coding using the convolutional code may be generated such that the input bit and the parity check bit are alternately arranged.

According to an embodiment, the obtaining of the first bit group and the second bit group from the encoded bits may include: obtaining a first input bit stream and a second input bit stream; encoding the first input bit stream by using a first channel coding algorithm and a second channel coding algorithm; and encoding the second input bit stream by using the second channel coding algorithm, wherein the first bit group may include the encoded first input bit stream, and the second bit group may include the encoded second bit stream.

According to an embodiment, the first channel coding algorithm may include a Reed-Solomon algorithm, and the second channel coding algorithm may include a low-density parity-check (LDPC) algorithm.

According to an embodiment, the obtaining of the first bit group and the second bit group from the encoded bits may include: performing a first puncturing operation to remove one or more bits from the encoded bits; and performing a second puncturing operation to remove one or more bits from the encoded bits, wherein the first bit group may include bits, which are included in both first output bits obtained by performing the first puncturing operation and second output bits obtained by performing the second puncturing operation, and the second bit group may include bits, which are included only in the first output bits or the second output bits.

According to an embodiment, the first bit group may be encoded by using an LDPC algorithm, the first bit group may be determined based on a level of importance of a transmission symbol, and the level of importance of the transmission symbol may be associated with a number of paths connecting the transmission symbol to reconstruction symbols.

According to an embodiment of the present disclosure, a terminal in a wireless communication system may include: a transceiver; and at least one processor configured to obtain, from encoded bits, a first bit group and a second bit group, arrange the encoded bits such that bits of the first bit group and bits of the second bit group are interleaved, modulate the arranged bits in the first bit group and the second bit group by using different modulation rates, and transmit a signal obtained based on the modulated bits, to a base station through the transceiver.

According to an embodiment, a modulation rate corresponding to the first bit group may be lower than a modulation rate corresponding to the second bit group.

According to an embodiment, a modulation scheme corresponding to the first bit group may include binary phase-shift keying (BPSK), and a modulation scheme corresponding to the second bit group may include quadrature phase-shift keying (QPSK).

According to an embodiment, the first bit group and the second bit group may be obtained through at least one of channel coding using a linear code or channel coding using a convolutional code, the first bit group may include an encoded bit corresponding to an input bit, and the second bit group may include a parity check bit for error control on the input bit.

According to an embodiment, an output of the channel coding using the linear code may be generated such that the input bit is concatenated to the parity check bit, and an output of the channel coding using the convolutional code may be generated such that the input bit and the parity check bit are alternately arranged.

According to an embodiment, the at least one processor may be further configured to obtain a first input bitstream and a second input bitstream, encode the first input bit stream by using a first channel coding algorithm and a second channel coding algorithm, and encode the second input bit stream by using the second channel coding algorithm, wherein the first bit group may include the encoded first input bit stream, and the second bit group may include the encoded second bit stream.

In the embodiments of the present disclosure described above, the elements included in the present disclosure have been expressed in the singular or plural form according to the suggested embodiments of the present disclosure. However, the expression in the singular or plural form is appropriately selected according to the suggested situations for convenience of explanation and is not intended to limit the present disclosure to the single or plural elements, and even when a certain element is expressed in the plural form, it may be provided with a single element, and even when a certain element is expressed in the singular form, it may be provided with a plurality of elements.

Meanwhile, the embodiments of the present disclosure disclosed in the present specification and the drawings are only particular examples for clearly describing the technical aspects of the present disclosure and helping understanding of the present disclosure, and are not intended to limit the scope of the present disclosure. That is, it would be obvious to one of skill in the art that other modifications based on the technical spirit of the present disclosure may be implemented. In addition, the above-described embodiments may be combined with one another and operated as necessary. For example, an embodiment of the present disclosure may be combined with parts of other embodiments of the present disclosure to operate a BS and a UE. In addition, the embodiments of the present disclosure may be applied to other communication systems, and other modifications based on the technical spirit of the embodiments may also be implemented. For example, the embodiments may also be applied to an LTE system, a 5G or New Radio (NR) system, etc.

The invention claimed is:

1. A method performed by a user equipment in a wireless communication system, the method comprising:
    performing a first puncturing operation and a second puncturing operation to remove one or more bits from encoded bits;
    generating a first bit group, wherein the first bit group includes at least one first bit common to first output bits obtained by the first puncturing operation and second output bits obtained by the second puncturing operation;
    generating a second bit group, wherein the second bit group includes at least one second bit included either in the first output bits or the second output bits;
    modulating the first bit group and the second bit group by using different modulation rates; and
    transmitting, to a base station, a signal obtained based on the modulation.

2. The method of claim 1, wherein a modulation rate corresponding to the first bit group is lower than a modulation rate corresponding to the second bit group.

3. The method of claim 2,
wherein a modulation scheme corresponding to the first bit group includes binary phase-shift keying (BPSK), and
wherein a modulation scheme corresponding to the second bit group includes quadrature phase-shift keying (QPSK).

4. The method of claim 1,
wherein the second bit group includes a parity check bit for error control on the input bit the first output bits correspond to a first code rate and the second output bits correspond to a second code rate, and
wherein the first code rate is different from the second code rate.

5. The method of claim 4,
wherein the first code rate is higher than the second code rate.

6. The method of claim 1,
wherein the at least one first bit corresponds to a most significant bit (MSB), and
wherein the at least one second bit corresponds to a least significant bit (LSB).

7. The method of claim 1,
wherein the at least one first bit and the at least one second bit are alternately arranged.

8. The method of claim 1,
wherein the encoded bits are encoded by using a turbo coding scheme.

9. A terminal in a wireless communication system, the terminal comprising:
a transceiver; and
at least one processor configured to:
perform a first puncturing operation and a second puncturing operation to remove one or more bits from encoded bits,
generate a first bit group, wherein the first bit group includes at least one first bit common to first output bits obtained by the first puncturing operation and second output bits obtained by the second puncturing operation,
generate a second bit group, wherein the second bit group includes at least one second bit included either in the first output bits or the second output bits,
modulate the first bit group and the second bit group by using different modulation rates, and
transmit a signal obtained based on the modulation, to a base station through the transceiver.

10. The terminal of claim 9, wherein a modulation rate corresponding to the first bit group is lower than a modulation rate corresponding to the second bit group.

11. The terminal of claim 10,
wherein a modulation scheme corresponding to the first bit group includes binary phase-shift keying (BPSK), and
wherein a modulation scheme corresponding to the second bit group includes quadrature phase-shift keying (QPSK).

12. The terminal of claim 9,
wherein the first output bits correspond to a first code rate and the second output bits correspond to a second code rate, and
wherein the first code rate is different from the second code rate.

13. The terminal of claim 12,
wherein the first code rate is higher than the second code rate.

14. The terminal of claim 9,
wherein the at least one first bit corresponds to a most significant bit, MSB, and
wherein the at least one second bit corresponds to a least significant bit, LSB.

15. The terminal of claim 9, wherein the at least one first bit and the at least one second bit are alternatively arranged.

16. The terminal of claim 9, wherein the encoded bits are encoded by using a turbo coding scheme.

* * * * *